United States Patent
Chen et al.

(10) Patent No.: US 10,284,675 B2
(45) Date of Patent: *May 7, 2019

(54) SYSTEMS AND METHODS FOR BROWSER-BASED GAMES

(71) Applicant: TENCENT TECHNOLOGY (SHENZHEN) COMPANY LIMITED, Shenzhen (CN)

(72) Inventors: Liangliang Chen, Shenzhen (CN); Zhen Li, Shenzhen (CN); Xuxin Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 3 days.

This patent is subject to a terminal disclaimer.

(21) Appl. No.: 15/883,467

(22) Filed: Jan. 30, 2018

(65) Prior Publication Data

US 2018/0213055 A1 Jul. 26, 2018

Related U.S. Application Data (63) Continuation of application No. 14/456,077, filed on Aug. 11, 2014, now Pat. No. 9,923,988, which is a (Continued)

(30) Foreign Application Priority Data

Jul. 10, 2013 (CN) .......................... 2013 1 0289356

(51) Int. Cl.
*G06F 15/167* (2006.01)
*H04L 29/08* (2006.01)
(Continued)

(52) U.S. Cl.
CPC ........ *H04L 67/2842* (2013.01); *A63F 13/335* (2014.09); *A63F 13/35* (2014.09); *A63F 13/77* (2014.09)

(58) Field of Classification Search
None
See application file for complete search history.

(56) References Cited

U.S. PATENT DOCUMENTS 7,707,242 B2 *  4/2010  DiMichele ............... A63F 13/12
                                                      709/203
8,856,268 B2 * 10/2014  Chen ....................... A63F 13/79
                                                      463/42
(Continued)

FOREIGN PATENT DOCUMENTS

CN       101470773 A      7/2009
CN       102209140 A     10/2011
(Continued)

OTHER PUBLICATIONS

Patent Cooperation Treaty, International Preliminary Report on Patentability, dated Jan. 12, 2016, in PCT/CN2014/078249.
(Continued)

*Primary Examiner* — Mohamed Ibrahim
(74) *Attorney, Agent, or Firm* — Sughrue Mion, PLLC (57) ABSTRACT

Systems and methods are provided for browser-based games. For example, a data-loading request is received for acquiring resource data and user data related to operations of a next phase of a browser-based game; a present networking state is detected; in response to the present networking state corresponding to an online state, first resource data and first user data are requested from the network-side server; the browser-based game is loaded based on at least information associated with the first resource data and the first user data (Continued)

received from the network-side server; and the first resource data and the first user data are stored in a cache.

14 Claims, 8 Drawing Sheets

Related U.S. Application Data continuation of application No. PCT/CN2014/078249, filed on May 23, 2014.

(51) Int. Cl.
| | | |
|---|---|---|
| *A63F 13/35* | (2014.01) | |
| *A63F 13/335* | (2014.01) | |
| *A63F 13/77* | (2014.01) | |

(56) References Cited

U.S. PATENT DOCUMENTS

| | | | |
|---|---|---|---|
| 2003/0224856 A1* | 12/2003 | Bukovsky | A63F 13/12 463/42 |
| 2005/0209002 A1 | 9/2005 | Blythe | |
| 2010/0227691 A1 | 9/2010 | Karsten | |
| 2011/0086706 A1 | 4/2011 | Zalewski | |
| 2012/0225720 A1 | 9/2012 | Baszucki | |
| 2013/0137518 A1 | 5/2013 | Lucas | |

FOREIGN PATENT DOCUMENTS

| | | |
|---|---|---|
| CN | 102447688 A | 5/2012 |
| CN | 102831182 A | 12/2012 |
| CN | 102902887 A | 1/2013 |
| CN | 102970361 A | 3/2013 |
| TW | 201249513 A | 12/2012 |
| TW | 201324353 A | 6/2013 |

OTHER PUBLICATIONS

China Patent Office, Office Action dated Feb. 27, 2015, in Application No. 201310289356.7.
Taiwan Patent Office, Office Action dated Dec. 14, 2015, in Application No. 103123857.
Patent Cooperation Treaty, International Search Report and Written Opinion of the International Searching Authority, dated Aug. 1, 2014, in PCT/CN2014/078249.

* cited by examiner

SYSTEMS AND METHODS FOR BROWSER-BASED GAMES

CROSS-REFERENCES TO RELATED APPLICATIONS

This is a continuation application of application Ser. No. 14/456,077, filed Aug. 11, 2014, which is a continuation of International Application No.: PCT/CN2014/078249, filed May 23, 2014, which claims priority to Chinese Patent Application No. 201310289356.7, filed Jul. 10, 2013, incorporated by reference herein for all purposes.

BACKGROUND OF THE INVENTION

Certain embodiments of the present invention are directed to computer technology. More particularly, some embodiments of the invention provide systems and methods for games. Merely by way of example, some embodiments of the invention have been applied to browser-based games. But it would be recognized that the invention has a much broader range of applicability.

Browser-based games are also called web games which include webpage-type games based on an Internet browser. A browser-based game usually does not need a large client to be downloaded, or certain configuration requirements of electronic devices. Users can conveniently close or switch a game webpage. Thus, browser-based games are widely implemented.

Usually, a browser-based game runs on a social network site (SNS) and users often need to get connected to the Internet to play. During the game, an electronic game device often needs to acquire from a network-side server in real time resource data necessary for different operating phases of the game. For instance, when a user logs into a browser-based game, a computer usually needs to request from the network-side server background images of the game; or when the user upgrades tasks, the computer may need to request from the network-side server configuration files related to upgrading rules. Moreover, an electronic game device usually needs to synchronize generated user data to the network-side server during the game. For instance, a computer often needs to upload a user's game score to the network-side server so that the server can rank all users of the SNS regarding the game. Or the computer may need to upload the user's experience points, props and other data to the network-side server so that the user can request from the network-side server such user data via his/her cell phone for playing the game on a cell phone.

The above-noted conventional technology has some disadvantages. For example, as data necessary for operation of a browser-based game is closely related to the game progress, the electronic game device often needs to constantly request data from the network-side server throughout the game. If the electronic device loses its connection to the Internet due to poor access conditions, the electronic device then may not be able to request relevant data from the network-side server and the browser-based game cannot run properly.

Hence it is highly desirable to improve the techniques for browser-based games.

BRIEF SUMMARY OF THE INVENTION

According to one embodiment, a method is provided for browser-based games. For example, a data-loading request is received for acquiring resource data and user data related to operations of a next phase of a browser-based game; a present networking state is detected; in response to the present networking state corresponding to an online state, first resource data and first user data are requested from the network-side server; the browser-based game is loaded based on at least information associated with the first resource data and the first user data received from the network-side server; and the first resource data and the first user data are stored in a cache.

According to another embodiment, a device for browser-based games includes: a receiving unit configured to receive a data-loading request for acquiring resource data and user data related to operations of a next phase of a browser-based game; a detection unit configured to detect a present networking state; a data requesting unit configured to, in response to the present networking state corresponding to an online state, request first resource data and first user data from the network-side server; a loading unit configured to load the browser-based game based on at least information associated with the first resource data and the first user data received from the network-side server; and a storing unit configured to store the first resource data and the first user data in a cache.

According to yet another embodiment, a non-transitory computer readable storage medium includes programming instructions for browser-based games. The programming instructions are configured to cause one or more data processors to execute certain operations. For example, a data-loading request is received for acquiring resource data and user data related to operations of a next phase of a browser-based game; a present networking state is detected; in response to the present networking state corresponding to an online state, first resource data and first user data are requested from the network-side server; the browser-based game is loaded based on at least information associated with the first resource data and the first user data received from the network-side server; and the first resource data and the first user data are stored in a cache.

For example, the systems and methods disclosed herein can be configured to store in a cache relevant data (e.g., resource data and user data) of a browser-based game requested by an electronic game device from a network-side server when the electronic device is online, so that the stored data can enable continuous running of the browser-based game when the electronic device is offline, hence ensuring continuous operation of the browser-based game in either an online state or an offline state.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Different from a console game which often requires downloading an installation package onto a local device in advance, a browser-based game usually does not require the installation of any local client, and a user can play the game directly on the browser. During the browser-based game, an electronic game device can request different resource data from a network-side server and send user data generated in the game to the network-side server synchronously according to the progress of the game. For instance, when the user launches the browser-based game, the electronic game device requests background images and profiles of Level 1. When the user advances to Level 2, the electronic device requests for the background images and profiles of Level 2. Or when the user finishes the combats on Map 1 and chooses Map 2 for another combat, the electronic device requests for the profiles of Map 2. When the user again chooses Map 1 for combat, the electronic device requests for the profiles of Map 1 again. As it is often unnecessary to install a local client for a browser-based game, the resource data and the user data the game needs can be acquired from the network-side server and such acquisition of data may not be completed once-off upon the launching of the game. Instead, the data is acquired during different phases of the game. For example, the data is acquired from level to level as described above. Hence, data acquisition by the electronic device takes place during the whole process of the game. If the electronic device loses the Internet connection for any reason during the game, the communication between the electronic device and the network-side server may be interrupted, and the data acquisition may fail so that the user cannot continue the game.

Figure 1:
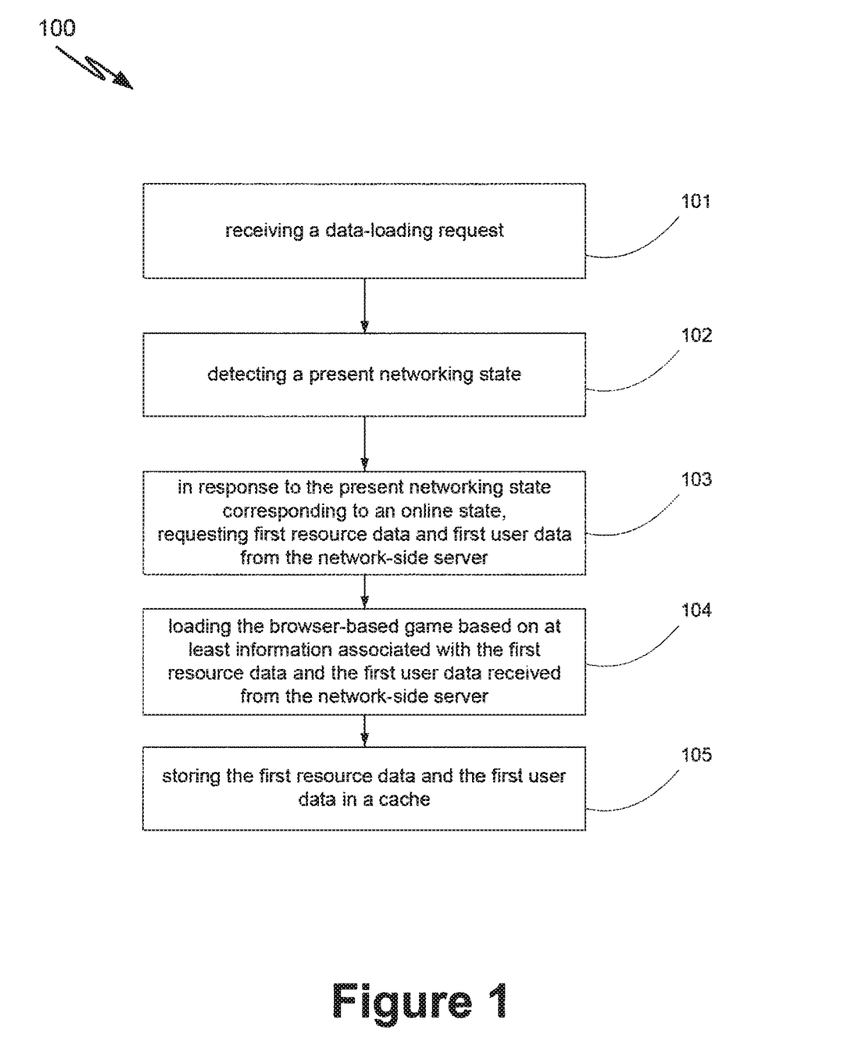
FIG. 1 is a simplified diagram showing a method for browser-based games according to one embodiment of the present invention.

FIG. 1 is a simplified diagram showing a method for browser-based games according to one embodiment of the present invention. The diagram is merely an example, which should not unduly limit the scope of the claims. One of ordinary skill in the art would recognize many variations, alternatives, and modifications. The method 100 includes at least the processes 101-105.

According to one embodiment, the process 101 includes receiving a data-loading request. For example, the data-loading request is sent by a main logic in the process of a browser-based game. As an example, the main logic is a core logic module for running the game and is used to control the launching of the game and the game operations. In another example, when data of a next phase of the game is needed, the main logic sends the data-loading request, where the data-loading request is configured to acquire resource data and user data related to the next phase of operations of the browser-based game. With the continuous progress of the game, the main logic needs to keep requesting for the game data necessary for different phases, in some embodiments.

According to another embodiment, the data of the browser-based game includes resource data and user data. For example, resource data includes profiles and various types of images, sound effects and/or other suitable data. In another example, a profile is mainly configured to establish rules of the game, e.g., character skills, tasks for different levels, etc. For different users, the resource data remain the same, which means the resource data are static data. In yet another example, user data is generated for specific users during the game, e.g., items and/or experience points of users. As an example, user data is generated after a particular game action and is different for different users, which means the user data is dynamic data.

According to yet another embodiment, the process 102 includes detecting a present networking state. For example, network-state detection is carried out upon receipt of the data-loading request. When the present networking state is online, i.e. the electronic device can have data communication with a network-side server, the processes 103, 104 and 105 are executed. For example, the process 103 includes requesting the network-side server for resource data and user data related to the next phase of operation. If the present networking state is online, it is possible to request the resource data and the user data related to the next phase of operation from the network-side server. Data-loading requests take place during the whole process of the game, in some embodiments. For example, data to be loaded includes the resource data and the user data related to the next phase of operation, e.g., images and missions of Level 2.

In one embodiment, the process 104 includes loading the browser-based game for the next phase according to the resource data and the user data received from the network-side server. For example, the resource data and the user data related to the next phase of operation are received from the network-side server after a data request is sent to the network-side server. In another example, the received data is loaded into the main logic that runs the next phase of the browser-based game according to the loaded data. In yet another example, the process 105 includes storing the resource data and the user data to a cache. The resource data and user data are stored in the cache after loading the browser-based game, so that when the electronic device loses the Internet connection, normal operations of the browser-based game can be maintained in an offline state, in some embodiments. For example, when the present networking state is offline, the electronic device cannot have data communication with the network-side server. It is possible to read the resource data and the user data related to the next phase of operation stored in the cache and then perform phased loading of the browser-based game according to such resource data and user data. In another example, the resource data and the user data stored in the cache are the resource data and the user data requested from the network-side server when the present networking state is online.

In another embodiment, the electronic device requests from the network-side server the resource data and the user data of various phases of the game and stores the received data. For example, relevant data related to the next phase of operation is located among the data corresponding to multiple different phases is loaded into the main logic and the main logic properly runs the game according to the loaded data. The process of storing data corresponding to different phases is a continuous and cumulative process, in certain embodiments. For example, when the present networking state is online, the electronic device stores the data acquired upon each request. With the progress of the game, the electronic device can eventually store the data related to all phases. As an example, when the user plays the game later, the electronic device can run any phase of the browser-based game in an offline state, similar to running a local console game.

Figure 2:
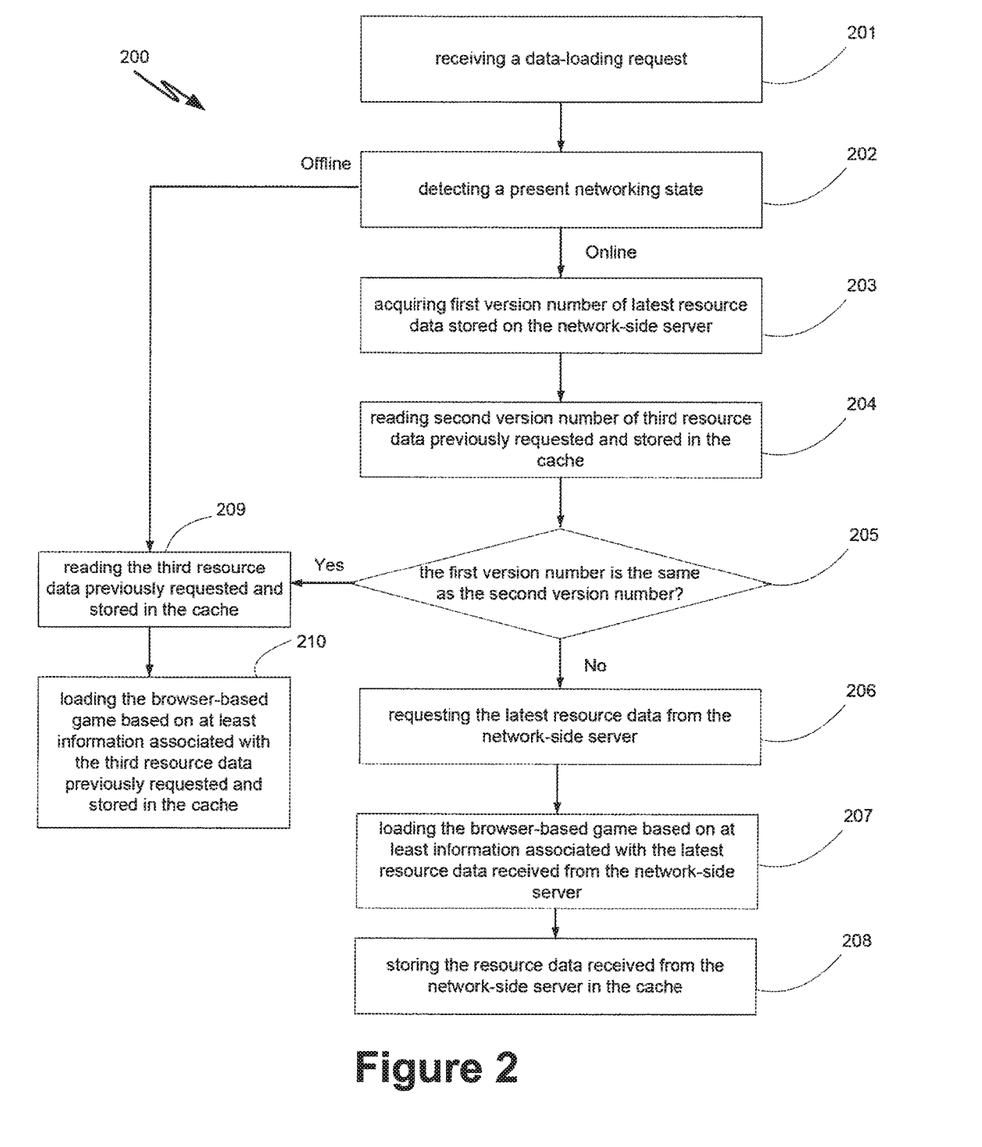
FIG. 2 is a simplified diagram showing a method for browser-based games according to another embodiment of the present invention.

FIG. 2 is a simplified diagram showing a method for browser-based games according to another embodiment of the present invention. The diagram is merely an example, which should not unduly limit the scope of the claims. One of ordinary skill in the art would recognize many variations, alternatives, and modifications. The method 200 includes at least the processes 201-210.

According to one embodiment, the process 201 includes receiving a data-loading request. For example, the data-loading request is sent by a main logic in the process of a browser-based game. In another example, the process 202 includes detecting a present networking state. In yet another example, an electronic game device can send a detection identifier to a network-side server and receive a response identifier from the network-side server to detect the present networking state. In yet another example, if a preset response identifier is received from the network-side server, it is determined that the present networking state is online. In yet another example, if the preset response identifier is not received from the network-side server, it is determined that the present networking state is offline.

According to another embodiment, the electronic game device checks an uplink data flow and/or a downlink data flow to detect the present networking state. For example, if either the uplink data flow or the downlink data flow is not 0, it is determined that the present networking state is online. If both the uplink data flow and the downlink data flow are found to remain 0 for a period of time, it is determined that the present networking state is offline. As an example, if the present networking state is online, the process 203 is executed. If the present networking state is offline, the process 209 is executed.

According to yet another embodiment, the process 203 includes acquiring a version number of latest resource data stored on the network-side server. For example, to avoid repeated network data expenses, the electronic device may request the version number of the latest resource data from the network-side server before requesting from the network-side server the resource data related to the next phase of operation. In another example, if the version number of the latest resource data from the network-side server is the same as the version number of the resource data corresponding to the same phase stored in the cache, the electronic device loads the browser-based game directly according to the resource data already stored in the cache instead of requesting from the network-side server the resource data repeatedly. In yet another example, a version number is configured to identify a version of latest resource data. A developer of a browser-based game may update the version of the browser-based game and then store resource data on the network-side server. For example, a version number includes a character string of ten-plus bytes which is much smaller than the resource data. The electronic device compares the version numbers instead of the contents of the resource data to save network data expenses, in certain embodiments.

In one embodiment, the process 204 includes reading the version number of the resource data previously requested and stored in the cache. For example, the electronic game device reads the version number of the resource data previously requested and stored in the cache. In another example, after the process 202 is executed, the process 204 may be executed before the process 203. In yet another example, the process 203 and the process 204 can be simultaneously executed after the process 202 is finished.

In another embodiment, the process 205 includes determining if the version number of the latest resource data is the same as the version number of the resource data previously requested and stored in the cache. For example, the electronic device compares the version number of the latest resource data from the network-side server and the version number of the resource data previously requested and stored in the cache. If the two version numbers are the same, the electronic device cancels the request for the resource data related to the next phase of operation from the network-side server, and the process 209 is executed. If the two version numbers are not the same, the process 206 is executed, and the electronic device requests the resource data related to the next phase of operation from the network-side server.

In yet another embodiment, the process 206 includes requesting the network-side server for the latest resource data related to the next phase of operation. For example, the process 207 includes loading the browser-based game according to the latest resource data requested from the network-side server. The electronic device loads the received latest resource data into the main logic that runs the next phase of the browser-based game according to the loaded resource data. In another example, the process 208 includes storing the resource data requested from the network-side server in the cache. The electronic device stores the received resource data in the cache so that the browser-based game can be loaded according to the resource data stored in the cache if the Internet connection is lost, in certain embodiments.

In yet another embodiment, the process 209 includes reading the resource data related to the next phase of operation stored in the cache. For example, when it is impossible to request resource data from the network-side server in an offline state, or when the version number of the latest resource data stored in the network-side server is the same as the version number of the previously received resource data stored in the cache, the electronic device executes the process 209, and reads the resource data related to the next phase of operation stored in the cache. As an example, the resource data related to the next phase of operation stored in the cache includes the resource data previously received from the network-side server in an online state.

In yet another embodiment, the process 210 includes loading the browser-based game according to the read resource data. For example, the electronic device loads the resource data read from the cache into the main logic that runs the next phase of the browser-based game according to the loaded resource data.

The electronic device stores in the cache the resource data received from the network-side server when it is online, in certain embodiments. Even if the Internet connection is lost, the electronic device can still continue loading the browser-based game according to the resource data stored in the cache. For example, the electronic device can firstly acquire from the network-side server the version number of the resource data before requesting for the resource data and determine the version number of the resource data so as to avoid repeated requests for the resource data, hence reducing network flows and operating costs.

Figure 3:
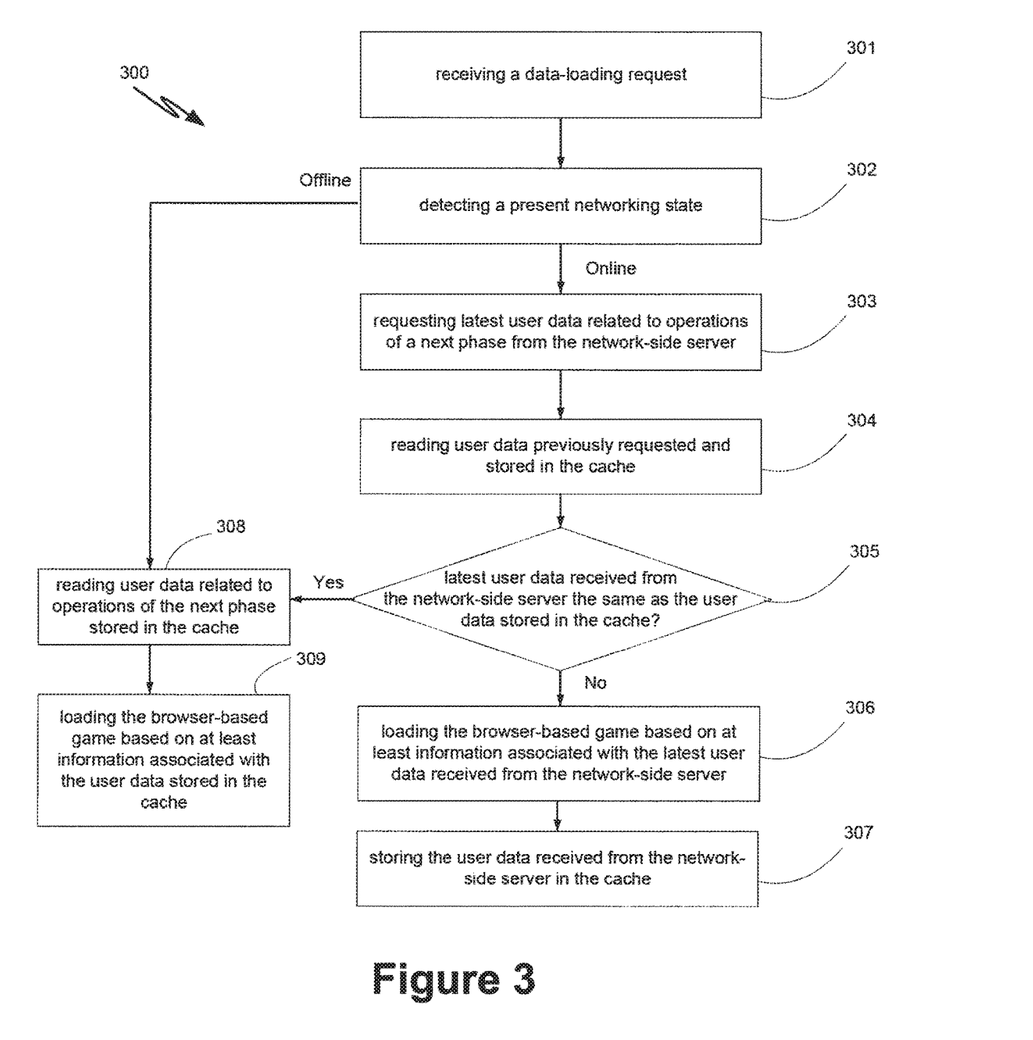
FIG. 3 is a simplified diagram showing a method for browser-based games according to one embodiment of the present invention.

FIG. 3 is a simplified diagram showing a method for browser-based games according to one embodiment of the present invention. The diagram is merely an example, which should not unduly limit the scope of the claims. One of ordinary skill in the art would recognize many variations, alternatives, and modifications. The method 300 includes at least the processes 301-309.

According to one embodiment, the process 301 includes receiving a data-loading request. For example, the data-loading request is received from the main logic for requesting user data associated with the operation of the browser-based game. In another example, the process 302 includes detecting a present networking state. If the present networking state is online, the process 303 is executed. If the present networking state is offline, the process 308 is executed.

According to another embodiment, the process 303 includes requesting the network-side server for the latest user data related to the next phase of operation. For example, the process 304 includes reading the user data previously requested and stored in the cache. As an example, the stored user data is previously requested from the network-side server by the electronic device in an online state. When the user launches a browser-based game, the electronic device requests the network-side server for user data. For instance, a user's level or experience points are requested so that the user can continue the game at a previous level. If the electronic device is in an online state upon the launching of the browser-based game and the electronic device sends a request to the network-side server for the user data, the user data read in the process 304 corresponds to the user data that the electronic device requested upon the launching of the browser-based game. If the electronic device is in an offline state upon the launching of the browser-based game, the user data read in the process 304 corresponds to the user data the electronic device requested when the user is playing the game online last time (e.g., the user data stored in the cache).

According to yet another embodiment, the process 305 includes determining if the user data received from the network-side server are the same as the user data previously requested and stored in the cache. For example, the electronic device compares the user data stored in the network-side server and the user data stored in the local cache. If the user data stored in the network-side server and the user data stored in the local cache are different, the electronic device executes the process 306, and directly loading the browser-based game according to the user data received from the network-side server. If the user data stored in the network-side server and the user data stored in the local cache are the same, the electronic device discards the user data received from the network-side server and executes the process 308. As an example, the electronic device reads the user data related to the next phase of operation stored in the cache.

In certain embodiments, the electronic device cannot compare user data before the user data is requested because user data is generated for a specific user and does not have a uniform version number. In some embodiments, the electronic device compares the user data to provide determination rules for storing the user data received from the network-side server in the cache. When the received user data are the same as the stored user data, the process for storing the received user data is canceled, so as to avoid consumption of the electronic device's processing resources arising from repeated storing of user data, in certain embodiments.

In one embodiment, the process 306 includes loading the browser-based game according to the received user data. For example, the electronic device loads the received latest user data into the main logic that runs the next phase of the browser-based game according to the loaded user data. As an example, the process 307 includes storing the received user data in the cache. The electronic device stores the received user data in the cache so that the browser-based game can be loaded according to the user data stored in the cache in case of loss of Internet connection. For example, the electronic device replaces the stored user data with the received user data in the process 307. When the electronic device receives new user data, the previously stored user data becomes outdated, so there is no need to store the outdated user data in the cache.

In another embodiment, the process 308 includes reading the user data related to the next phase of operation stored in the cache. For example, when it is impossible to request from the network-side server user data in an offline state, or when the user data requested from the network-side server are the same as the user data previously requested and stored in the cache, the electronic device implements the process 308 to read the user data stored in the cache for game loading.

In yet another example, the process 309 includes loading the browser-based game according to the read user data. For example, the electronic device loads the read user data from the cache into the main logic that runs the next phase of the browser-based game according to the loaded user data. In another example, the electronic device may check if any new user data are written into the cache when it finds that the present networking state is online. If new user data are written into the cache, the electronic device reads the new user data from the cache and sends the new user data to the network-side server, in some embodiments.

In certain embodiments, only reading operations are involved with the resource data, and the operations on the user data in the cache may involve both reading operations and writing operations. For example, reading operations refer to reading user data from the cache or requesting user data from the network-side server. The purpose of reading user data is to load the browser-based game. In another example, writing operations related to user data refer to writing the user data generated during the game into the cache. In yet another example, a browser-based game also involves synchronizing the user data written into the cache to the network-side server. Synchronizing the user data to the network-side server is expected to store the user data in the cloud so that the electronic device can acquire and load the previous user data from the network-side server when the user intends to play the browser-based game next time. As an example, synchronizing the user data to the network-side server is further expected to enable the network-side server to rank, associate or otherwise handle the data of all users in the SNS so as to improve the users' attachment to the browser-based game. The user data generated by the game can be written into the cache when the electronic device is in an offline state, according to some embodiments. For example, when the electronic device is in an online state, it can upload the user data in the cache to the network-side server so as to conform the local user data to the data stored in the network-side server, according to certain embodiments. In another example, the electronic device stores the user data in the cache so that the browser-based game can be loaded according to the user data stored in the cache if the Internet connection is lost, in certain embodiments. When the electronic devices runs the browser-based game, both resource data and user data may be loaded, e.g., according to the method 200 and the method 300 respectively, in some embodiments.

In certain embodiments, the method 100, the method 200, and/or the method 300 can be applied to the following scenario. For example, a user launches a browser-based game on a computer and selects to continue the game on Level 3 where the computer is in an online state. The computer requests the mission of Level 3 and the user's experience points of 150 from a network-side server so that the computer can load the browser-based game according to the requested data. Thereafter, the computer loses the Internet connection and the user's experience points increase to 180 after the user finishes the mission of Level 3. As the user has performed the mission of Level 4 previously, the computer loads the game according to the mission of Level 4 stored in the cache. If the user chooses to exit the game before finishing Level 4 and the computer is still in an offline state, the computer stores the experience points of 180 in the cache and ends the game, according to certain embodiments.

For example, thereafter, the user launches the browser-based game again and chooses to continue the game on Level 4. The computer stills remains offline. The computer determines that the mission of Level 4 is already stored in the cache and therefore cancels the request of the mission of Level 4 to the network-side server. The computer instead loads the game according to the stored mission of Level 4. As an example, meanwhile, the computer requests the network-side server for the user experience points (e.g., the previously loaded 150 points). The computer determines that the experience points of 150 are already outdated through comparison and hence loads the game according to the experience points of 180 in the cache. Further, the computer synchronizes the experience points of 180 to the network-side server. When the user accomplishes the mission of Level 4, the experience points increase to 200. The computer determines that the mission of Level 5 is not stored in the cache and therefore requests the mission of Level 5 from the network-side server. Moreover, the computer stores the mission of Level 5 received from the network-side server in the cache. When the user exits the game without accomplishing the mission of Level 5, the computer stores the experience points of 200 and uploads the experience points to the network-side server, in some embodiments.

As an example, thereafter, the user continues the browser-based game via a cell phone and chooses to continue the game on Level 5. The cell phone cannot be connected to the Internet due to poor signals. As the user only performed the mission of Level 4 previously on the cell phone, the cell phone loads the game according to the mission of Level 4 and the experience points of 180 so that the user continues the game on Level 4. The cell phone gets connected to the Internet when the user is performing the mission of Level 4. According to the user's progress in the game, the cell phone requests the missions of Level 6 and Level 7 successively. After the user exits the game, the cell phone then reports the experience points of 250 of Level 7 to the network-side server, in certain embodiments. For example, the user plays the game on a computer again when the computer is in an offline state and stores only the mission of Level 5 and the experience points of 200. As such, the computer loads the game according to the mission of Level 5 and the experience points of 200 so that the user continues the game on Level 5. The computer is then connected to the network-side server and acquires from the server and stores the missions of Level 6 and Level 7 and the experience points of 250. The computer loads the game according to the mission of Level 7 and the experience points of 250 and allows the user to continue the game on Level 7, in some embodiments.

Figure 4:
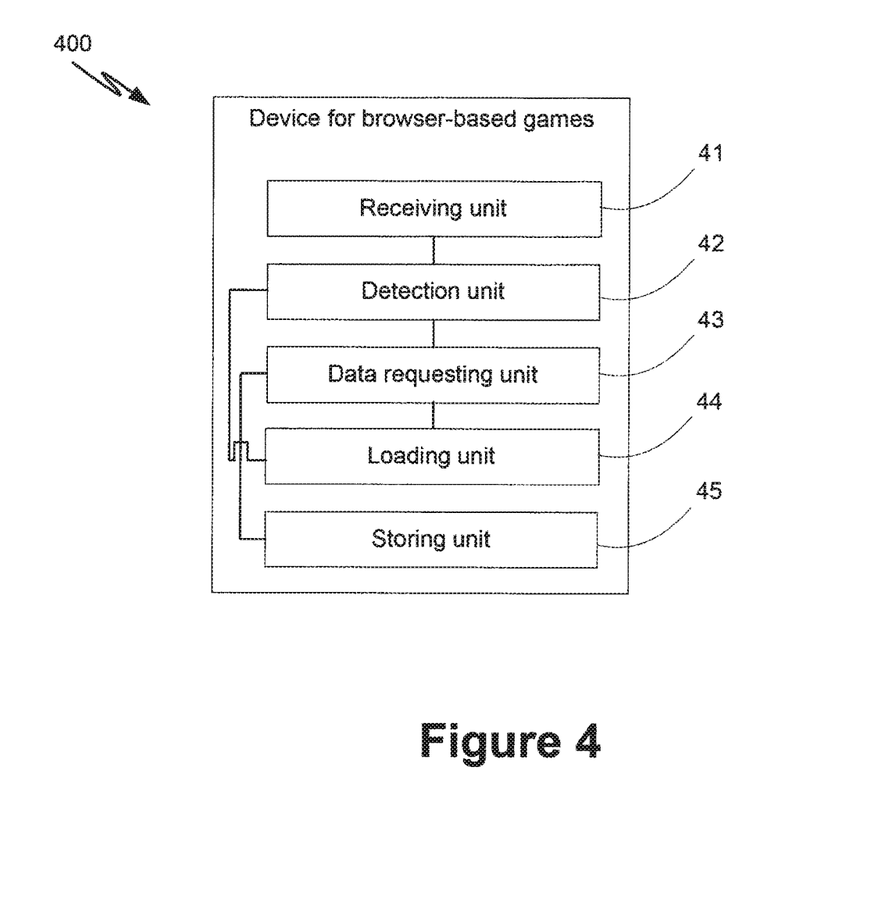
FIG. 4 is a simplified diagram showing a device for browser-based games according to one embodiment of the present invention.

FIG. 4 is a simplified diagram showing a device for browser-based games according to one embodiment of the present invention. The diagram is merely an example, which should not unduly limit the scope of the claims. One of ordinary skill in the art would recognize many variations, alternatives, and modifications. The device 400 includes: a receiving unit 41, a detection unit 42, a data requesting unit 43, a loading unit 44 and a storing unit 45.

According to one embodiment, the receiving unit 41 is configured to receive a data-loading request for acquiring resource data and user data related to operations of a next phase of a browser-based game. The detection unit 42 is configured to detect a present networking state after the receiving unit 41 receives the data-loading request. The data requesting unit 43 is configured to, in response to the present networking state corresponding to an online state, request first resource data and first user data from the network-side server. The loading unit 44 is configured to load the browser-based game based on at least information associated with the first resource data and the first user data received from the network-side server. The storing unit 45 is configured to store the first resource data and the first user data in a cache.

Figure 5:
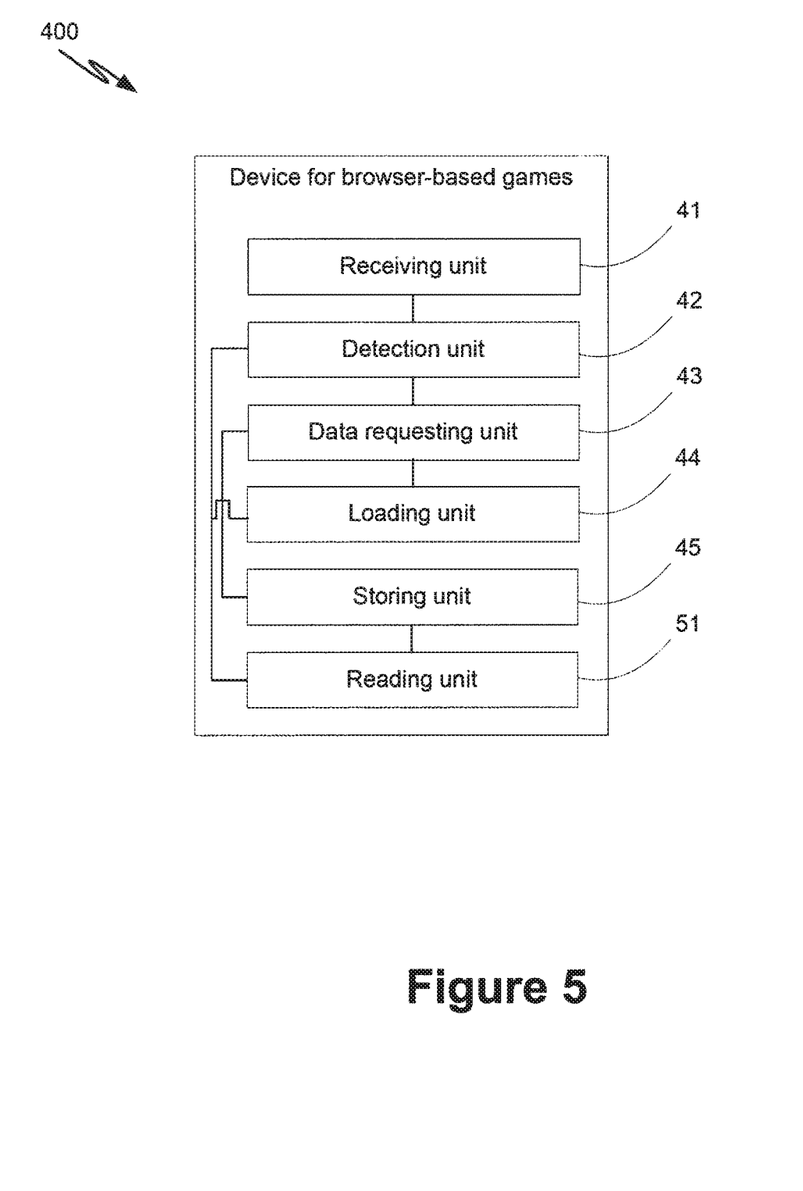
FIG. 5 is a simplified diagram showing a device for browser-based games according to another embodiment of the present invention.

FIG. 5 is a simplified diagram showing a device for browser-based games according to another embodiment of the present invention. The diagram is merely an example, which should not unduly limit the scope of the claims. One of ordinary skill in the art would recognize many variations, alternatives, and modifications.

According to one embodiment, the device 400 further includes: a reading unit 51 configured to, in response to the present networking state corresponding to an offline state, read second resource data and second user data from the cache. For example, the loading unit 44 is further configured to load the browser-based game based on at least information associated with the second resource data and the second user data.

Figure 6:
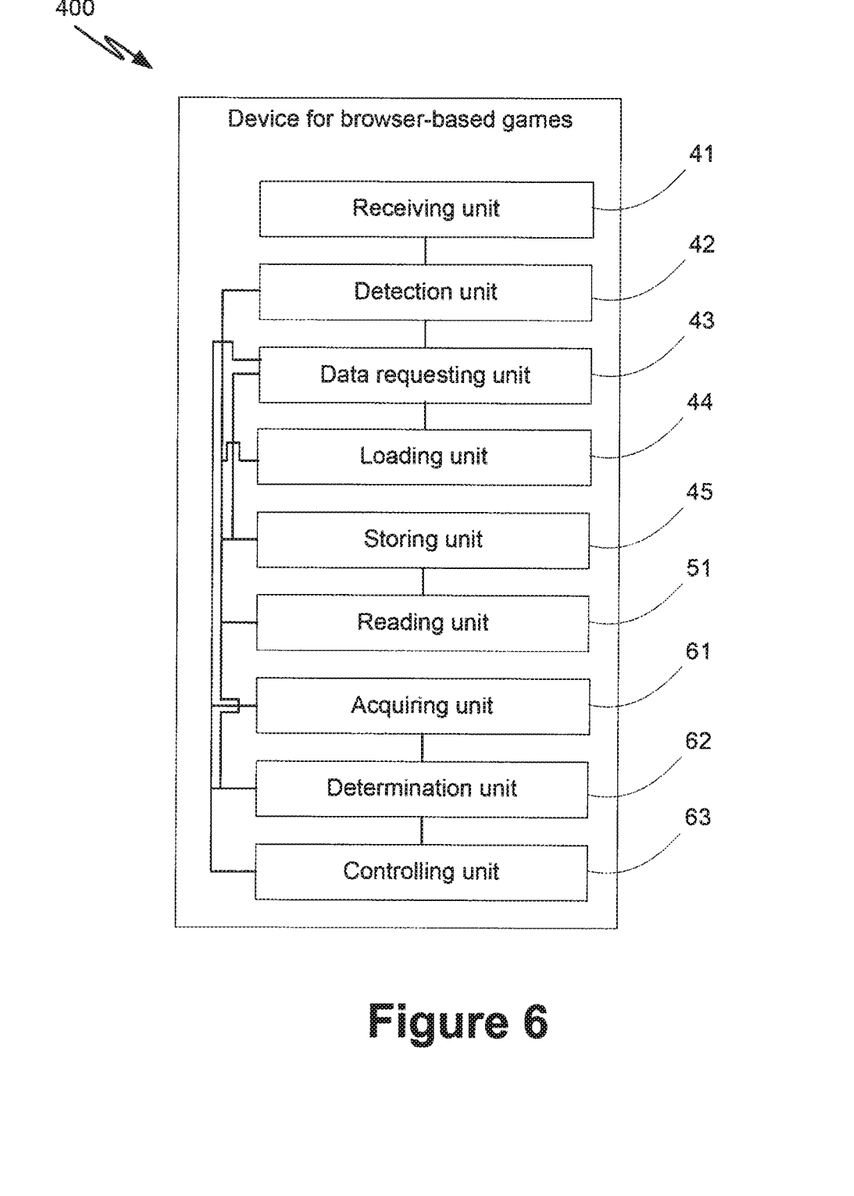
FIG. 6 is a simplified diagram showing a device for browser-based games according to yet another embodiment of the present invention.

FIG. 6 is a simplified diagram showing a device for browser-based games according to yet another embodiment of the present invention. The diagram is merely an example, which should not unduly limit the scope of the claims. One of ordinary skill in the art would recognize many variations, alternatives, and modifications.

According to one embodiment, the device 400 further includes: an acquiring unit 61, a determining unit 62 and a controlling unit 63. For example, the acquiring unit 61 is configured to acquire first version number of latest resource data stored on the network-side server. The reading unit 51 is further configured to read second version number of third resource data previously requested and stored in the cache. The determining unit 62 is configured to determine whether the first version number is the same as the second version number. The controlling unit 63 is configured to, in response to the first version number being the same as the second version number, cancel requesting the first resource data from the network-side server. The data requesting unit 43 is further configured to, in response to the first version number being different from the second version number, request the latest resource data from the network-side server.

According to another embodiment, the reading unit 51 is further configured to, in response to the first version number being the same as the second version number, read the third resource data previously requested and stored in the cache. The loading unit 44 is further configured to load the browser-based game based on at least information associated with the third resource data previously requested and stored in the cache. The loading unit 44 is further configured to, in response to the first version number being different from the second version number, load the browser-based game based on at least information associated with the latest resource data received from the network-side server.

According to yet another embodiment, the reading unit 51 is further configured to read third user data previously requested and stored in the cache. The determining unit 62 is further configured to determine whether the first user data received from the network-side server is the same as the third user data previously requested and stored in the cache. The data requesting unit 43 is further configured to, in response to the first user data being the same as the third user data, discard the first user data. The storing unit 45 is further configured to, in response to the first user data being different from the third user data, store the first user data in the cache.

Figure 7:
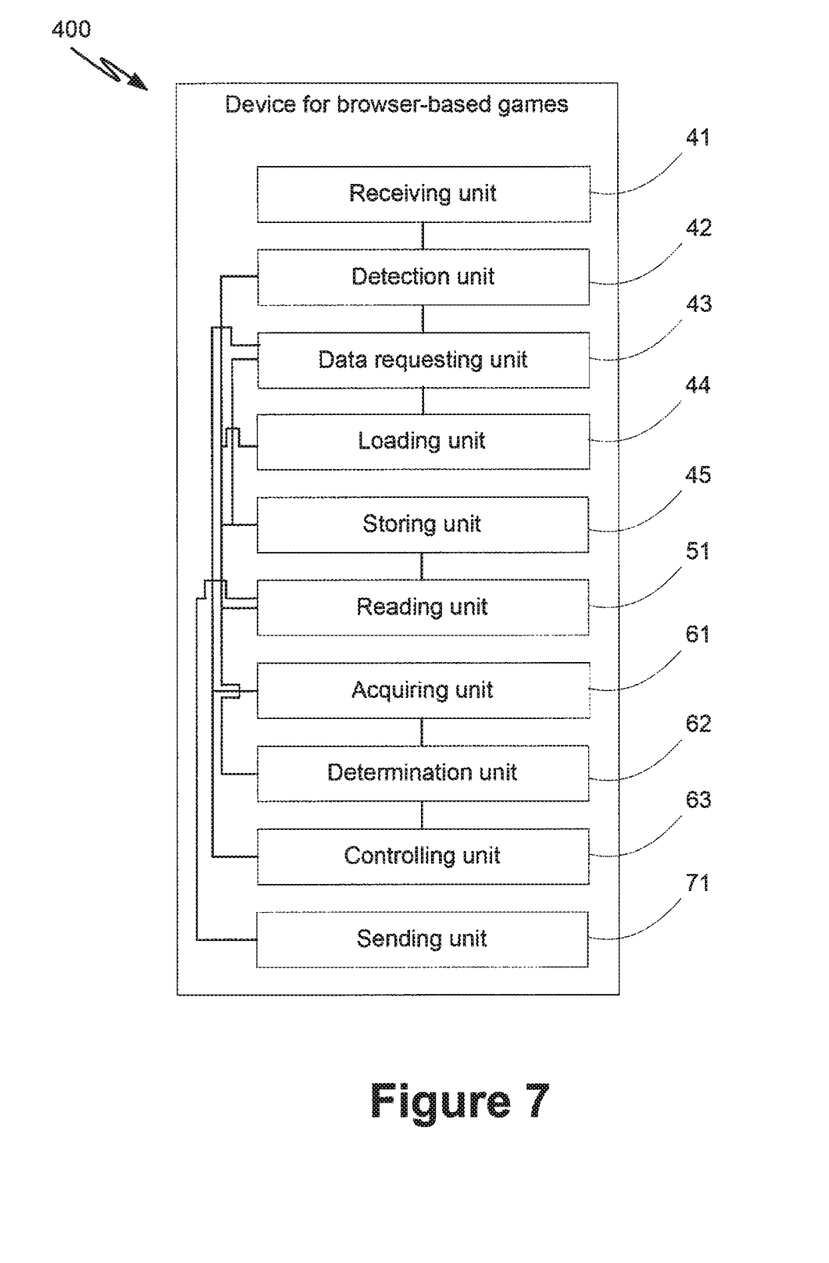
FIG. 7 is a simplified diagram showing a device for browser-based games according to yet another embodiment of the present invention.

FIG. 7 is a simplified diagram showing a device for browser-based games according to yet another embodiment of the present invention. The diagram is merely an example, which should not unduly limit the scope of the claims. One of ordinary skill in the art would recognize many variations, alternatives, and modifications.

According to one embodiment, the device 400 further includes a sending unit 71. The detection unit 42 is further configured to, in response to the present networking state corresponding to an online state, detect whether the cache includes new user data. The reading unit 51 is further configured to, in response to the cache including the new user data, read the new user data. The sending unit 71 is configured to send the new user data to the network-side server.

In some embodiments, the device 400 requests resource data from the network-side server and compares a version number of the resource data received from the network-side server and another version number of locally stored resource data so as to avoid repeated request for the resource data, hence reducing network flows and operating costs. In certain embodiments, the device 400 is used to perform the method 100, the method 200, and/or the method 300. The device 400 is installed in a computer, a cell phone or other suitable electronic devices to perform the method 100, the method 200, and/or the method 300, in some embodiments.

Figure 8:
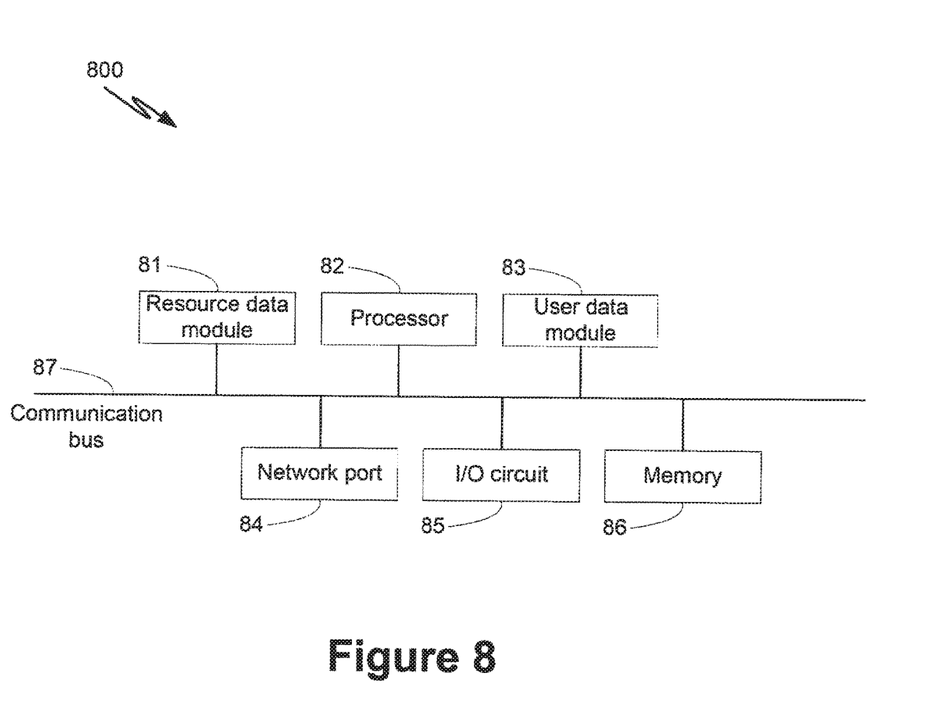
FIG. 8 is a simplified diagram showing a device for browser-based games according to yet another embodiment of the present invention.

FIG. 8 is a simplified diagram showing a device for browser-based games according to yet another embodiment of the present invention. The diagram is merely an example, which should not unduly limit the scope of the claims. One of ordinary skill in the art would recognize many variations, alternatives, and modifications. The device 800 includes: a resource data module 81, a processor 82, a user data module 83, a network port 84, an I/O circuit 85, a memory 86 and a communication bus 88.

According to one embodiment, the resource data module 81 is configured to receive a data-loading request sent by the processor 82, where the data-loading request is configured to acquire resource data related to the next phase of operation of a browser-based game. For example, the user data module 83 is configured to receive the data-loading request sent by the processor 82, where the data-loading request is configured to acquire user data related to the next phase of operation of the browser-based game. As an example, the network port 84 is configured to detect the present networking state after the resource data module 81 and the user data module 83 receive the data-loading request sent by the processor 82. The I/O circuit 85 is configured to request a network-side server for resource data and user data related to the next phase of operation when the network port 84 determines the present networking state is online. In another example, the resource data module 81 is further configured to send to the processor 82 the resource data received by the I/O circuit 85 so that the processor 82 can load the browser-based game according to the resource data. The user data module 83 is further configured to send to the processor 82 the user data received by the I/O circuit 85 so that the processor 82 can load the browser-based game according to the user data.

According to another embodiment, the memory 86 is configured to store the resource data and the user data received by the I/O circuit 85. For example, the resource data module 81 is further configured to, when the network port 84 finds that the present networking state is offline, read the resource data related to the next phase of operation stored in the memory 86 and send to the processor 82 the resource data so that the processor 82 can load the browser-based game according to the resource data. As an example, the user data module 83 is further configured to, when the network port 84 finds that the present networking state is offline, read the user data related to the next phase of operation stored in the memory 86 and send to the processor 82 the user data read so that the processor 82 can load the browser-based game according to the user data. In another example, the communication bus 88 is configured for the data communication among the resource data module 81, the processor 82, the user data module 83, the network port 84, the I/O circuit 85 and the memory 86.

According to yet another embodiment, a method is provided for browser-based games. For example, a data-loading request is received for acquiring resource data and user data related to operations of a next phase of a browser-based game; a present networking state is detected; in response to the present networking state corresponding to an online state, first resource data and first user data are requested from the network-side server; the browser-based game is loaded based on at least information associated with the first resource data and the first user data received from the network-side server; and the first resource data and the first user data are stored in a cache. For example, the method is implemented according to at least FIG. 1, FIG. 2, and/or FIG. 3.

According to another embodiment, a device for browser-based games includes: a receiving unit configured to receive a data-loading request for acquiring resource data and user data related to operations of a next phase of a browser-based game; a detection unit configured to detect a present networking state; a data requesting unit configured to, in response to the present networking state corresponding to an online state, request first resource data and first user data from the network-side server; a loading unit configured to load the browser-based game based on at least information associated with the first resource data and the first user data received from the network-side server; and a storing unit configured to store the first resource data and the first user data in a cache. For example, the device is implemented according to at least FIG. 4, FIG. 5, FIG. 6, and/or FIG. 7.

According to yet another embodiment, a non-transitory computer readable storage medium includes programming instructions for browser-based games. The programming instructions are configured to cause one or more data processors to execute certain operations. For example, a data-loading request is received for acquiring resource data and user data related to operations of a next phase of a browser-based game; a present networking state is detected; in response to the present networking state corresponding to an online state, first resource data and first user data are requested from the network-side server; the browser-based game is loaded based on at least information associated with the first resource data and the first user data received from the network-side server; and the first resource data and the first user data are stored in a cache. For example, the storage medium is implemented according to at least FIG. 1, FIG. 2, and/or FIG. 3.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method comprising:
   determining whether a transition from a prior phase to a next phase of a browser-based game occurs, the prior phase preceding a next phase in operations of the browser-based game;
   in response to the transition occurring, determining information associated with resource data and user data related to the next phase and adding the information to a data-loading request;
   receiving the data-loading request including the information;
   in response to receiving the data-loading request, displaying in a web browser the browser-based game based on the information in the data-loading request;
   detecting a present networking state; and
   in response an online state being detected, requesting and receiving server resource data and server user data from a network server;
   loading the browser-based game based on the server resource data and the server user data; and
   storing the server resource data and the server user data in a cache.

2. The method of claim 1, further comprising:
in response to an offline state being detected, reading cached resource data and cached user data from the cache; and
loading the browser-based game based on the cached resource data and the cached user data.

3. The method of claim 2, wherein requesting the server resource data comprises:
acquiring a version number of latest resource data from the network-side server;
reading a version number of the cached resource data stored in the cache;
comparing the server version number to the cached version number; and
in response to the version numbers being the same, canceling requesting the server resource data, and
in response to the version numbers being different, requesting the server resource data comprises requesting the latest resource data.

4. The method of claim 3, further comprising:
in response to the version numbers being the same, reading the cached resource data from the cache and loading the browser-based game based on the cached resource data.

5. The method of claim 4, further comprising:
comparing the server user data to the cached user data; and
in response to the user data being the same, discarding the server user data; and
in response to the user data being different, updating the cache with the server user data.

6. The method of claim 5, further comprising:
in response to the online state being detected, detecting whether the cache includes new user data; and
in response to the cache including the new user data, transmitting the new user data to the network server.

7. A method comprising:
monitoring phases of operations of a browser-based game displayed in a web browser;
monitoring a connection state to a network server;
when the connection state is offline:
in response to a phase of the game being finished, loading a next phase of the game from phases of the game stored in the cache; and
when the connection state is online:
in response to a phase of the game being finished:
transmitting, to the network server, a request for resource data for a next phase of the game and for user data, and receiving the resource data and user data in response to the request;
storing the resource data for the next phase in the cache; and
loading, in the web-browser, the next phase of the game based on the resource data and the newer of cached user data stored in the cache and the received user data.

8. The method according to claim 7, further comprising:
in response to the phase of the game being in mid-phase and the game being exited:
storing user data related to the mid-phase in the cache to update the cached user data when the connection state is offline; and
transmitting resource data related to the mid-phase of the game and user data related to the mid-phase to the network server when the connection state is online.

9. The method according to claim 7, further comprising:
receiving a request to play a specific phase of the phases of the game;
determining whether the specific phase is stored in the cache;
in response to the specific phase being stored in the cache, loading, in the web-browser, the specific phase of the game from the cache and cached user data from the cache;
in response to the specific phase not being stored in the cache and the connection state being offline, loading, in the web-browser, a next phase of the game from phases of the game stored in the cache regardless of the requested specific phase; and
in response to the specific phase not being stored in the cache and the connection state being online:
transmitting, to the network server, a request for resource data for the specific phase and for user data, and receiving the resource data and user data in response to the request;
storing the resource data for the specific phase in the cache; and
loading, in the web-browser, the specific phase of the game based on the resource data and the newer of cached user data stored in the cache and the received user data.

10. The method according to claim 7, further comprising:
in response to the phase of the game in mid-phase and the connection state transitioning from offline to online:
transmitting, to the network server, a request for user data and receiving the user data;
comparing the received user data with user data stored in the cache and updating the user data on the network server in response to the user data stored in the cache being newer.

11. A device comprising:
at least one memory configured to store computer program code; and
at least one processor configured to access the at least one memory and operate according to the computer program code, the computer program code including:
phase monitoring code configured to cause at least one of the at least one procesor to monitor phases of operations of a browser-based game displayed in a web browser;
connection monitoring code configured to cause at least one of the at least one processor to monitor a connection state to a network server;
first loading code configured to cause at least one of the at least one processor to:
when the connection state is offline:
in response to a phase of the game being finished, load a next phase of the game from phases of the game stored in the cache; and
when the connection state is online:
in response to a phase of the game being finished:
transmit, to the network server, a request for resource data for a next phase of the game and for user data, and receiving the resource data and user data in response to the request;
store the resource data for the next phase in the cache; and
load, in the web-browser, the next phase of the game based on the resource data and the newer of cached user data stored in the cache and the received user data.

12. The device according to claim 11, wherein the computer program code further comprises updating code configured to cause at least one of the at least one processor to:
in response to the phase of the game being in mid-phase and the game being exited:
store user data related to the mid-phase in the cache to update the cached user data when the connection state is offline; and
transmit resource data related to the mid-phase of the game and user data related to the mid-phase to the network server when the connection state is online.

13. The device according to claim 11, wherein the computer program code further comprises:
receiving code configured to cause at least one of the at least one processor to receive a request to play a specific phase of the phases of the game;
determining code configured to cause at least one of the at least one processor to determine whether the specific phase is stored in the cache; and
second loading code configured to cause at least one of the at least one processor to:
in response to the specific phase being stored in the cache, load, in the web-browser, the specific phase of the game from the cache and cached user data from the cache;
in response to the specific phase not being stored in the cache and the connection state being offline, load, in the web-browser, a next phase of the game from phases of the game stored in the cache regardless of the requested specific phase; and
in response to the specific phase not being stored in the cache and the connection state being online:
transmit, to the network server, a request for resource data for the specific phase and for user data, and receiving the resource data and user data in response to the request;
store the resource data for the specific phase in the cache; and
load, in the web-browser, the specific phase of the game based on the resource data and the newer of cached user data stored in the cache and the received user data.

14. The device according to claim 11, wherein the computer program code further comprises updating code configured to cause at least one of the at least one processor to:
in response to the phase of the game in mid-phase and the connection state transitioning from offline to online:
transmit, to the network server, a request for user data and receiving the user data;
compare the received user data with user data stored in the cache and update the user data on the network server in response to the user data stored in the cache being newer.

* * * * *